(12) United States Patent
Dziabis et al.

(10) Patent No.: US 8,927,449 B2
(45) Date of Patent: Jan. 6, 2015

(54) MULTIPLE BURN ZONES WITH INDEPENDENT CIRCULATION LOOPS

(75) Inventors: Gary A. Dziabis, Addison, IL (US); Charles T. Ressl, Mount Prospect, IL (US); Steven C. Kozup, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 307 days.

(21) Appl. No.: 13/327,156

(22) Filed: Dec. 15, 2011

(65) Prior Publication Data

US 2013/0157839 A1  Jun. 20, 2013

(51) Int. Cl.
*B01J 20/30* (2006.01)

(52) U.S. Cl.
USPC .......................................................... 502/35

(58) Field of Classification Search
CPC .......................... B01J 20/3458; B01J 20/3078
USPC ........................................................... 502/35

See application file for complete search history.

(56) References Cited

U.S. PATENT DOCUMENTS

| | | | | |
|---|---|---|---|---|
| 5,688,473 A | * | 11/1997 | Lawrence et al. | 422/144 |
| 6,103,652 A | | 8/2000 | Brunet et al. | |
| 6,884,400 B1 | * | 4/2005 | Austin et al. | 422/216 |
| 7,585,803 B1 | | 9/2009 | Price et al. | |

OTHER PUBLICATIONS

PCT International Preliminary Report on Patentability dated Jun. 26, 2014 for PCT/US2012/054979.

* cited by examiner

*Primary Examiner* — Edward Johnson

(57) ABSTRACT

A process for a continuous regeneration of a catalyst wherein the regeneration section includes at least two separate zones. The regeneration includes a combustion zone, and an oxygen boost zone, where the process utilizes at least two independent regeneration gas loops for control of the amount of oxygen to regenerate the catalyst.

14 Claims, 1 Drawing Sheet

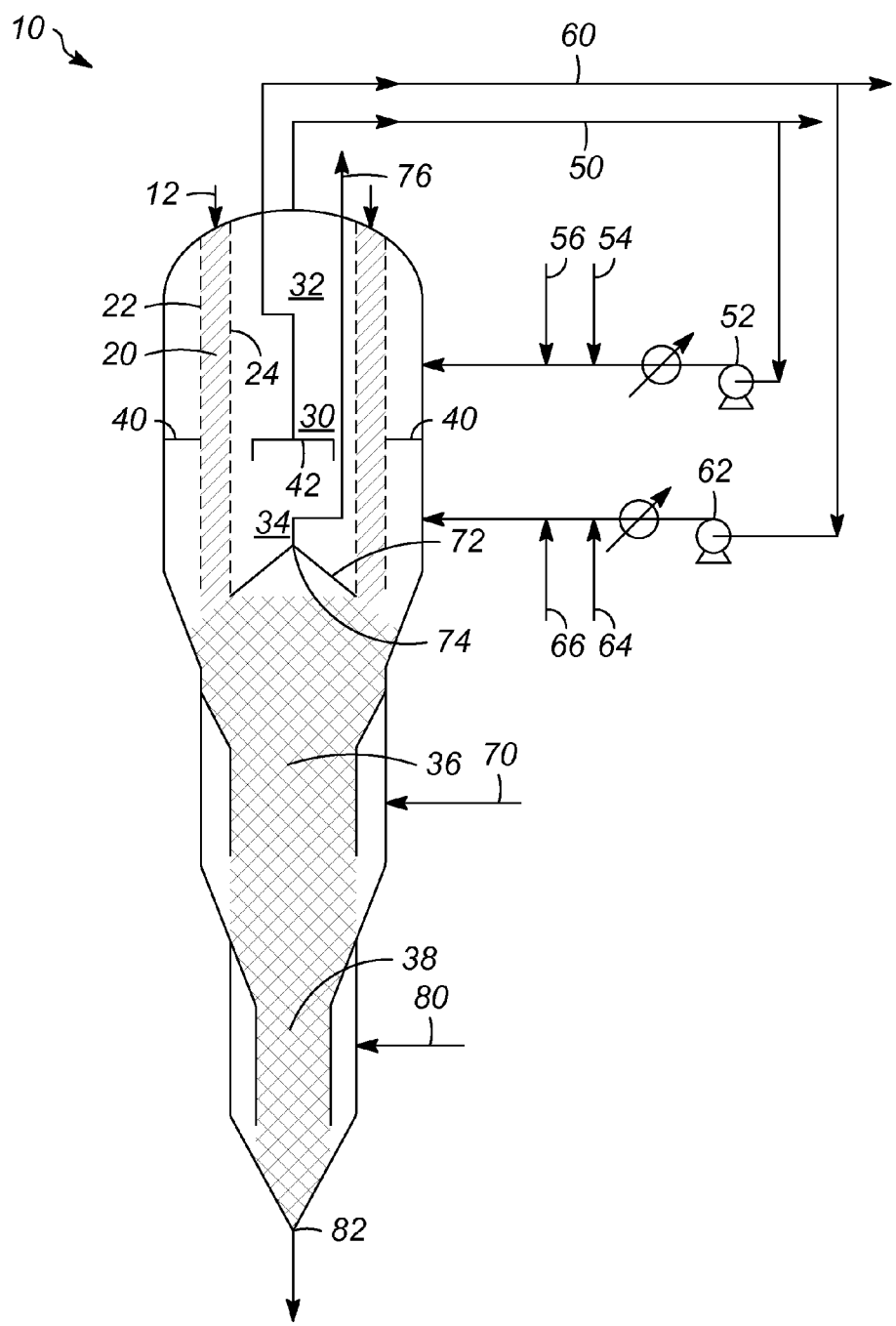

MULTIPLE BURN ZONES WITH INDEPENDENT CIRCULATION LOOPS

FIELD OF THE INVENTION

The present invention relates to processes for the conversion of a hydrocarbon feedstream to useful hydrocarbon products. In particular, the invention relates to the continuous regeneration of spent catalyst for reuse in the hydrocarbon conversion process.

BACKGROUND OF THE INVENTION

Hydrocarbons, and in particular petroleum, are produced from the ground as a mixture. This mixture is converted to useful products through separation and processing of the streams in reactors. The conversion of the hydrocarbon streams to useful products is often through a catalytic process in a reactor. The catalysts can be solid or liquid, and can comprise catalytic materials on a support. In particular, catalytic metals on a support are extensively used. The catalytic metals include platinum group metals, as well as other metals. During the processing of the hydrocarbons, the catalysts deactivate over time. One primary cause of deactivation is the generation and buildup of coke on the catalyst. The accumulation of coke blocks access to catalytic sites on the catalyst. The regeneration of the catalyst is normally performed through the removal of the coke, where the coke is combusted at a high-temperature with a gas having oxygen. These processes can be performed either in a continuous manner with the catalyst cycled through the reactor and the regenerator, or the process can be performed in a semi-continuous manner, such as with multiple fixed beds, where one bed is taken off stream to regenerate the catalyst, while the other beds continue operation.

With the continuous regeneration process, a recycle gas is continuously passed to the combustion zone in the regenerator and a flue gas containing the combustion products is removed. The combustion process is controlled through the oxygen content in the recycle gas. The recycle gas stream comprises a portion of the flue gas, and an additional stream of new combustion gas, while venting another portion of the flue gas from the regenerator. This helps maintain the temperature of the combustion gas, as well as setting up a steady state condition of continuous addition of spent catalyst and combustion gas to the regenerator, while continuously drawing regenerated catalyst and flue gas.

Catalyst regeneration methods are disclosed in U.S. Pat. No. 5,053,371 to Williamson, and U.S. Pat. No. 6,048,814 to Capelle, et al. for removing coke from catalyst particles through combustion. The combustion process can be damaging to the catalyst, and better methods of control of the combustion process are important for improving the life of the catalyst in the reactor-regenerator cycle. Producing a better process allows for more cycles of the catalyst through the regenerator, and increases the life of the catalyst. This can be achieved through improvements in the process and control of the regenerator.

SUMMARY OF THE INVENTION

The present invention provides an improved catalyst regeneration process. The process includes passing a spent catalyst stream to a first, or upper, regeneration zone to partially regenerate the catalyst through controlled combustion of the carbon on the catalyst. The partially regenerated catalyst is passed to a second, or lower, regeneration zone to fully regenerate the catalyst. The process includes passing a first regeneration gas comprising oxygen to the first, or upper, regeneration zone, and passing a second regeneration gas to the second, or lower, regeneration zone. The regeneration gas streams are independent gas streams for providing control of the volume and oxygen content in the individual gas streams.

Other objects, advantages and applications of the present invention will become apparent to those skilled in the art from the following detailed description and drawings.

BRIEF DESCRIPTION OF THE DRAWING

The FIGURE is an illustration of the regeneration zone and the circulating oxidizing gas streams for regeneration of catalyst flowing through the regenerator.

DETAILED DESCRIPTION OF THE INVENTION

The present invention is a process for the continuous regeneration of a catalyst. The most common application is the removal of coke from catalyst particles that contain a metal from the platinum group, and the most common process for this invention is the catalytic dehydrogenation process of paraffins to olefins. The regenerator in the olefin conversion process is described in U.S. Pat. No. 7,585,803, issued to Price, et al. on Sep. 8, 2009, and is incorporated here by reference in its entirety.

The current regenerator design includes two zones in the total combustion zone. These are an upper combustion zone and an oxygen boost zone. With this design the maximum oxygen concentration in the lower zone is limited by the overall oxygen consumption and percentage of the boost zone in the total combustion zone. Typically, this means the maximum oxygen concentration in the oxygen boost zone is about 2% with a split of the combustion gas of 70% to the upper combustion zone and 30% to the oxygen boost zone. The process can be made more robust and it is desired to provide for an increase in the oxygen concentration to the oxygen boost zone. A preferred level would be to increase the oxygen concentration to 5% by volume of the combustion gas in the oxygen boost zone.

With the current design, the portions of the recycle gas which are enhanced with additional oxygen, or oxygen containing gas, and introduced to the oxygen boost zone pass through the upper combustion zone without being depleted of oxygen. This results in increasing the oxygen concentration in the overall recycle gas exiting the regeneration vessel to a relatively high level to the upper combustion zone. This relatively high level of oxygen is intolerable for appropriate controlled combustion in the upper combustion zone. This requires additional dilution gas that is introduced to the upper combustion zone in order to reduce the oxygen concentration in the upper combustion zone. A consequence is an increase in recycle gas, flue gas venting, and utilities usage. Separating these two recycle gas streams provides more control.

The present invention is designed to improve the control and improve the regeneration of the catalyst. The process includes passing a spent catalyst stream to a regenerator, where the regenerator includes an upper regeneration zone, and a lower regeneration zone. The catalyst enters the upper regeneration zone and passes through to the lower regeneration zone. A first regeneration gas stream is passed to the upper regeneration zone to combust the coke on the catalyst, and generates a combustion flue gas that is removed from the regenerator. The spent catalyst is partially regenerated in the upper regeneration zone and is passed as a partially regenerated catalyst stream to the lower regeneration zone. A second regeneration gas stream is passed to the lower regeneration zone, to create a regenerated catalyst stream. The first and second regeneration gas streams are independent streams to provide control over the amount of oxygen in each stream and to control the combustion in each combustion zone.

The process is further described with respect to the FIGURE. A stream of spent catalyst particles 12 is continuously introduced to a regenerator 10. Although the term continuous is applied to this process herein, the process is more of a semi-continuous process where small amounts of catalyst are withdrawn from the reactor and passed to the regenerator on a relatively continuous basis. The catalyst particles flow downward through an annular region 20 defined by retention screens 22, 24 and which is located in the combustion zone 30. The combustion zone 30 is divided into an upper combustion zone 32 and a lower combustion zone 34, which is also known as an oxygen boost zone 34. The upper combustion zone 32 is separated from the lower combustion zone 34 by baffles 40 and a separate lower flue gas collection device 42. As catalyst particles flow down through the upper combustion zone 32, a first regeneration gas is contacted with the catalyst particles to combust the carbon on the catalyst particles. The catalyst particles flow through the upper regeneration zone slowly to provide sufficient time for the carbon to be combusted. The catalyst will have an average residence time in the upper zone between 3 and 5 hours, with a preferred time between 3.5 and 4.5 hours.

The first regeneration gas is cycled through a first regeneration gas loop 50 using a first blower 52 for circulation of the regeneration gas, where flue gas from the upper, or first, combustion zone 32 is passed into the first regeneration gas loop 50. The flue gas is made up of carbon monoxide, carbon dioxide, water, unreacted oxygen and other non-reactive gases generated in the combustion section and withdrawn from the regeneration zone as flue gas. The regeneration gas is flue gas that forms a recycle gas loop wherein the flue gas stream is continually withdrawn from the process and is admixed with an oxygen-containing gas 54 to replenish consumed oxygen and returned to the initial combustion section as the first regeneration gas. A portion of the flue gas is vented to maintain a continuous steady flow of regeneration gas. The flue gas is heated to a combustion temperature before passing to the upper combustion zone as the first regeneration gas stream. The first combustion temperature is between 450 C and 600 C, with a preferable temperature between 470 C and 500 C, with a more preferred temperature between 470 C and 485 C, and with an operational control of the temperature in the neighborhood of 477 C. Oxygen 54 is added to the regeneration gas stream to a level of between 0.5% and 2% by volume, with a preferred range of 0.5% to 1.5% by volume. The regeneration gas comprising recycled gas with additional oxygen and enters the upper combustion zone. The oxygen level is monitored in the recycle gas and additional oxygen is added as needed to bring the oxygen levels to within desired ranges. The level of oxygen is to control the combustion to prevent damage to the catalyst and to the equipment where the combustion occurs. Additional control on the gas composition includes a nitrogen gas stream 56 to add a diluent should the oxygen levels need further control. In an alternative, the oxygen containing gas can be mixed with the nitrogen before adding the gas stream to the first regeneration gas stream.

The upper combustion zone is frequently unable to combust all of the carbon deposited on the catalyst. The present invention includes a lower combustion zone 34 where a separate regeneration gas is used to complete the combustion process and to burn off the residual carbon on the catalyst.

The catalyst is further processed and flows from the upper combustion zone 32 to the lower combustion zone 34, where the catalyst is contacted with a second regeneration gas stream for removing the residual carbon. The lower combustion zone is also referred to as the oxygen boost zone. The second regeneration gas is cycled through a second regeneration gas loop 60 using a second blower 62 for circulation of the regeneration gas, where flue gas from the lower, or second, combustion zone 34 is passed into the second regeneration gas loop 50. The flue gas is made up of carbon monoxide, carbon dioxide, water, unreacted oxygen and other non-reactive gases generated in the combustion section and withdrawn from the regeneration zone as flue gas through a separate loop flue gas collection device 42. The second regeneration gas is flue gas that forms a second recycle gas loop 60 wherein the flue gas stream is continually withdrawn from the process and is admixed with an oxygen-containing gas 64 to replenish consumed oxygen and returned to the lower combustion section as the second regeneration gas. A portion of the flue gas is vented to maintain a continuous steady flow of the second regeneration gas. The flue gas is heated to a second combustion temperature before passing to the lower combustion zone. The second combustion temperature is between 500 C and 600 C, with a preferable temperature between 550 C and 570 C, with an operational control of the temperature in the neighborhood of 560 C. Additional control on the gas composition includes a nitrogen gas stream 66 to add a diluent should the oxygen levels need further control. In an alternative, the oxygen containing gas can be mixed with the nitrogen before adding the gas stream to the second regeneration gas stream.

The lower combustion zone, or oxygen boost zone, is operated and sized to allow for the catalyst to reside in the lower zone between 1 and 3 hours, with a preferred average residence time between 1.5 hours and 2.5 hours. The oxygen concentration in the oxygen boost zone is greater than for the upper combustion zone, and is controlled to a level between 2% and 5% by volume.

After the removal of carbon from the catalyst, the catalyst is further processed to redistribute the catalytic metal over the support. The combustion process in removing the carbon from the catalyst tends to agglomerate the metal particles. This would make the catalyst less effective and would reduce the life of the catalyst. The metal particles can be redistributed over the catalyst surface through contact with a halogen containing gas. Therefore, catalyst particles exiting the oxygen boost zone 34, are passed to a halogenations zone 36. The halogenation zone 36 is preferably in the same vessel to minimize external handling, as well as minimize the amount of heating and cooling of the catalyst during transfer between vessels. A halogen containing gas is admitted to the halogenations zone 36 through an inlet to a halogenation gas loop 70. The halogen containing gas contacts the catalyst and redistributes the catalytic metal on the catalyst surface. The gas flows upward through the halogenation zone 36, and is collected at a halogenation gas collection device 72. The halogenation collection device 72 is preferably an impervious baffle affixed to the bottom of the inner screen of the oxygen boost zone 34, and has an outlet 74 affixed to a halogen gas circulation pipe 76. The halogen circulation system can include a separate blower for circulating the gas, as well as appropriate driers for removing moisture and adsorbent beds for removing residual effluents from the catalyst as the catalyst flows through the halogenation zone 36. A preferred halogen containing gas includes chlorine in the gas as the active halogen.

Following regeneration, the catalyst is dried. The combustion process generates water as one of the combustion products and the water can be adsorbed onto the regenerated catalyst. The presence of water adversely affects the process and needs to be removed before the catalyst is returned to the reactor. In one embodiment, the catalyst drying is performed in the regenerator 10. The catalyst flows from the halogenation zone 36 to a drying zone 38. A drying gas 80 is passed into the drying zone 38 and flows over the regenerated catalyst to remove any residual water. The drying gas is heated to a temperature between 390 C and 510 C before passing into the drying zone 38. The drying gas is distributed around the drying zone 38 and flows up through the catalyst passing down through the drying zone 38. The duration for drying is largely governed by the height of the zone 38. The zone is sized to provide for an average residence time of at least 4 hours for the catalyst particles. The drying gas flows up through the drying zone 38 and the halogenations zone 36 and is passed out of the regenerator through the outlet 74. The dried and regenerated catalyst is withdrawn through the catalyst outlet 82 at the bottom of the regenerator 10.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A catalyst regeneration process comprising:
   passing a spent catalyst stream to an upper regeneration zone;
   passing a first regeneration gas stream comprising oxygen to the upper regeneration zone, thereby generating a partially regenerated catalyst stream;
   passing the partially regenerated catalyst stream to a lower regeneration zone; and
   passing a second regeneration gas stream comprising oxygen to the lower regeneration zone, thereby generating a regenerated catalyst stream;
   wherein the first regeneration gas stream and the second regeneration gas stream are independent streams.

2. The process of claim 1 wherein the first regeneration gas stream is passed to the upper regeneration zone using a first gas blower, and a first gas circulation loop.

3. The process of claim 1 wherein the second regeneration gas stream is passed to the lower regeneration zone using a second gas blower, and a second gas circulation loop.

4. The process of claim 1 wherein the upper regeneration zone is operated at a temperature between 450 C to 500 C.

5. The process of claim 1 wherein the lower regeneration zone is operated at a temperature between 500 C and 600 C.

6. The process of claim 1 wherein the catalyst has an average residence time in the lower regeneration zone between 1 and 3 hours.

7. The process of claim 6 wherein the catalyst has an average residence time in the lower regeneration zone between 1.5 and 2.5 hours.

8. The process of claim 1 wherein the catalyst has an average residence time in the upper regeneration zone between 3 and 5 hours.

9. The process of claim 8 wherein the catalyst has an average residence time in the upper regeneration zone between 3.5 and 4.5 hours.

10. The process of claim 1 further comprising passing the regenerated catalyst stream to a halogenation zone, and contacting the catalyst with a halogen containing gas.

11. The process of claim 10 wherein the halogen containing gas comprises chlorine.

12. The process of claim 1 wherein the oxygen concentration in the second regeneration gas stream is between 2% and 5% by volume.

13. The process of claim 1 wherein the first regeneration gas stream comprises a first recycle gas stream with added nitrogen to control the oxygen content of the first regeneration gas.

14. The process of claim 1 wherein the second regeneration gas stream comprises a second recycle gas stream with added nitrogen to control the oxygen content of the second regeneration gas.

* * * * *